United States Patent
Prusinowski et al.

(10) Patent No.: US 6,837,656 B2
(45) Date of Patent: Jan. 4, 2005

(54) MOBILITY EQUIPMENT SECUREMENT DEVICE

(75) Inventors: Richard C. Prusinowski, Royal Oak, MI (US); Gary L Talbot, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 95 days.

(21) Appl. No.: 10/173,522

(22) Filed: Jun. 17, 2002

(65) Prior Publication Data

US 2003/0231936 A1 Dec. 18, 2003

(51) Int. Cl.[7] .............................................. B60P 7/08
(52) U.S. Cl. ........................ 410/30; 410/3; 410/7; 410/12; 410/23; 410/97
(58) Field of Search ............................. 410/2, 3, 4, 7, 410/11, 12, 23, 30, 97, 100; 183/32; 248/499; 224/403

(56) References Cited

U.S. PATENT DOCUMENTS

| | | | | |
|---|---|---|---|---|
| 1,047,048 A | * | 10/1912 | Harrison | 410/19 |
| 1,733,269 A | * | 10/1929 | Mauk et al. | 410/30 |
| 1,776,935 A | * | 9/1930 | Snyder | 410/30 |
| 1,846,750 A | * | 2/1932 | Patterson | 410/8 |
| 3,912,139 A | * | 10/1975 | Bowman | 410/3 |
| 4,407,616 A | * | 10/1983 | Hinze | |
| 4,623,289 A | * | 11/1986 | Apostolos | 410/7 |
| 4,659,266 A | * | 4/1987 | Thelen et al. | 410/10 |
| 4,671,713 A | * | 6/1987 | Lenkman | 410/7 |
| 4,730,964 A | * | 3/1988 | Joyner | 410/23 |
| 4,886,403 A | * | 12/1989 | Gresham | 410/10 |
| 4,995,775 A | * | 2/1991 | Gresham | 410/10 |
| 5,026,225 A | * | 6/1991 | McIntyre | 410/23 |
| 5,344,265 A | * | 9/1994 | Ullman et al. | 410/3 |
| 5,388,937 A | * | 2/1995 | Farsai | 410/9 |
| 5,391,030 A | * | 2/1995 | Lee | 410/12 |
| 5,489,170 A | * | 2/1996 | Inoue et al. | 410/7 |
| 5,567,095 A | * | 10/1996 | James et al. | 410/7 |
| 5,628,595 A | * | 5/1997 | Harris | 410/7 |
| 5,888,038 A | * | 3/1999 | Ditch et al. | 410/7 |
| 5,908,274 A | * | 6/1999 | Silberman | 410/10 |
| 6,059,496 A | * | 5/2000 | Stevens | 410/7 |
| 6,099,219 A | * | 8/2000 | Bartholomay | 410/20 |
| 6,231,283 B1 | * | 5/2001 | Stowers | 410/9 |
| 6,428,254 B2 | * | 8/2002 | Craft | 410/7 |
| 6,474,916 B2 | * | 11/2002 | Constantin | 410/7 |

\* cited by examiner

*Primary Examiner*—Stephen Gordon
(74) *Attorney, Agent, or Firm*—Laura C. Hargitt

(57) ABSTRACT

A device for securing mobility equipment and a mobility equipment hoist in a motor vehicle. The device comprises a structural configuration, at least one wheel chock, and a tie-down system. The structural configuration affixes to pre-installed anchors on the motor vehicle. The at least one wheel chock secures the front portion of the mobility equipment. The tie-down system secures the rear or center portion of the mobility equipment. A method of securing mobility equipment and a mobility equipment hoist in a motor vehicle is also disclosed.

20 Claims, 9 Drawing Sheets

MOBILITY EQUIPMENT SECUREMENT DEVICE

BACKGROUND OF THE INVENTION

1. Field of the Invention

The present invention relates generally to securement devices. More particularly, the present invention relates to a device for securing mobility equipment and a mobility equipment hoist in a motor vehicle.

2. Background of the Invention

In the illustrated prior art installation according to FIG. 1, it is known that unoccupied mobility equipment 11 (e.g. wheelchairs, scooters, and the like) may be transported in a vehicle 13. Typically, the mobility equipment 11 is loaded into a storage compartment area 15 within the vehicle 13 (e.g. the rear portion of a mini-van, the rear portion of a full-sized van, the trunk of a car, the bed of a truck, or the like) by a lifting device 17. The lifting device 17 is usually a conventional mobility equipment hoist 17 that comprises an installation mounting arm 19, a motor 21, a boom portion 23, and a hook portion 25 connected to a lift strap 27. The hook portion 25 comprises a T-bar that is typically placed underneath a Y-bar (not shown) of the mobility equipment's seat 29 so that the mobility equipment 11 may be loaded into the vehicle 13. Conventional mobility equipment hoists 17 are commercially available from a number of suppliers, one of which is the Bruno Corporation of Madison, Wis.

Currently, standards that document proper installation techniques for mobility equipment hoists 17 in a vehicle 13 have not been properly addressed. In one possible recommended arrangement, the mobility equipment hoist 17 may be installed in the storage compartment area 15 of the vehicle 13 with a 6 mm stud, an L-bracket, a latch plate, and a seat belt mounting hole (not shown). However, this arrangement does not provide a significant amount of rigidity for loading heavy mobility equipment 11 and allows deflection about the base pan 31 of the vehicle 13. Thus, damage may occur to the base pan 31 as a result of undistributed load characteristics due to the mobility equipment hoist installation arrangement.

Although generally adequate for short-term installations, some users may wish to supplement the recommended installation arrangement. Typically, a supplemental installation arrangement may further comprise additional support bolts (not shown) added to the recommended installation arrangement, such as 10 mm or 12 mm bolts. In order for this supplemental installation arrangement to take place, the vehicle 13 is typically modified. Such modifications include the drilling of three or four mounting holes into the vehicular frame or base pan 31.

However, this supplemental installation arrangement may not be permissible in a leased vehicle 13 without the customer bearing responsibility for the installation alteration damages caused by the drilling of the mounting holes. Even further, if the desired location for drilling the mounting holes is not carefully chosen, a hole may be accidentally drilled into a spare tire, a gas tank, or the body of the vehicle 13. Such accidental drillings may typically result in undesirable damage including ruined spare tires, holes in gas tanks, or even water ingression into the passenger compartment area when the vehicle 13 if it is exposed to rain or when the vehicle 13 is driven through a car wash.

Even further, if the installation arrangement of the hoist 17 is not properly leveled, the overall load of the hoist 17 may tend to be improperly distributed when external forces are applied thereto during the operation of the vehicle 13. In such a situation, it is possible that the hoist 17 may detach from its installation arrangement in the storage compartment area 15 and become a large projectile during certain accident situations.

Yet even further, another problem associated with current mobility equipment and hoist arrangements is that once the mobility equipment 11 is loaded into the vehicle 13 by the hoist 17, the unoccupied mobility equipment 11 is typically left unsecured in the storage compartment area 15. If the mobility equipment 11 is left in an unsecured manner, the mobility equipment 11 is prone to become a projectile during certain accident situations.

Thus, although adequate for most applications, the supplemental installation arrangement does not prevent the drilling of mounting holes into the vehicular frame or base pan 31. Even further, the conventional and supplemental installation arrangements do not impede the hoist 17 or mobility equipment 11 from becoming a large projectile in the vehicle 13 during extreme accident situations.

As a result of the drawbacks associated with the conventional and supplemental installation arrangement techniques for mobility equipment hoists 17 and associated mobility equipment 11, it is apparent that there is a need for a device that improves installation and securing arrangements for mobility equipment hoists 17 and associated mobility equipment 11.

SUMMARY OF THE INVENTION

In a first embodiment of the invention, a device for securing mobility equipment and a mobility equipment hoist in a motor vehicle is described. The device comprises a structural configuration, at least one wheel chock, and a tie-down system. The structural configuration affixes to pre-installed anchors on the motor vehicle. The at least one wheel chock secures the front portion of the mobility equipment. The tie-down system secures the rear or center portion of the mobility equipment.

Another embodiment of the invention is a device for securing mobility equipment and a mobility equipment hoist in the storage compartment area of a minivan. In this embodiment, the device comprises a structural configuration, at least one wheel chock, a tie-down system, and a rear latch plate. The structural configuration is defined by horizontal and vertical bars that are made of reinforced steel. The structural configuration affixes to floor pins located in floor pockets and seat belt anchors located about the motor vehicle. The structural configuration further comprises a plurality of J-hooks, bolts, wheel chock-receiving portions, and a mounting arm-receiving portion. The J-hooks engage the floor pins. The bolts pass through the structural configuration and engage the seat belt anchors. The wheel chock-receiving portions are located at the top-left, top-middle, and top-right of the structural configuration for selectively locating the at least one wheel chock in order to secure the front portion of the mobility equipment. The mounting arm receiving portion selectively mounts a mounting arm of the hoist. The tie-down system secures the rear or center portion of the mobility equipment. The tie-down system further comprises a handle portion, a double-forked hook, a seat belt-like material, and a cam device. The seat belt material intermediately connects the handle portion and the double-forked hook. The seat belt interacts with the cam device for providing additional cinching of the tie-down system. The rear latch plate is attached to the structural configuration and about a rear latching mechanism that latches a hatch portion of the minivan.

Another embodiment of the invention is a device for securing mobility equipment and a mobility equipment hoist in a motor vehicle. The device comprises means for securing the device to the motor vehicle, means for securing the mobility equipment hoist to the device, means for securing the front portion of the mobility equipment to the device, and means for securing the rear or center portion of the mobility equipment to the device.

Another embodiment of the invention is a method of securing mobility equipment and a mobility equipment hoist in a motor vehicle comprising the steps of installing a securing device to the motor vehicle, securing the mobility equipment hoist to the securing device, loading the mobility equipment into the motor vehicle with the mobility equipment hoist, securing the front portion of the mobility equipment, and securing the rear or center portion of the mobility equipment.

Various additional aspects and advantages of this invention will become apparent to those skilled in the art from the following detailed description of the preferred embodiment, when read in light of the accompanying drawings.

DESCRIPTION OF THE PREFERRED EMBODIMENTS

Figure 1:
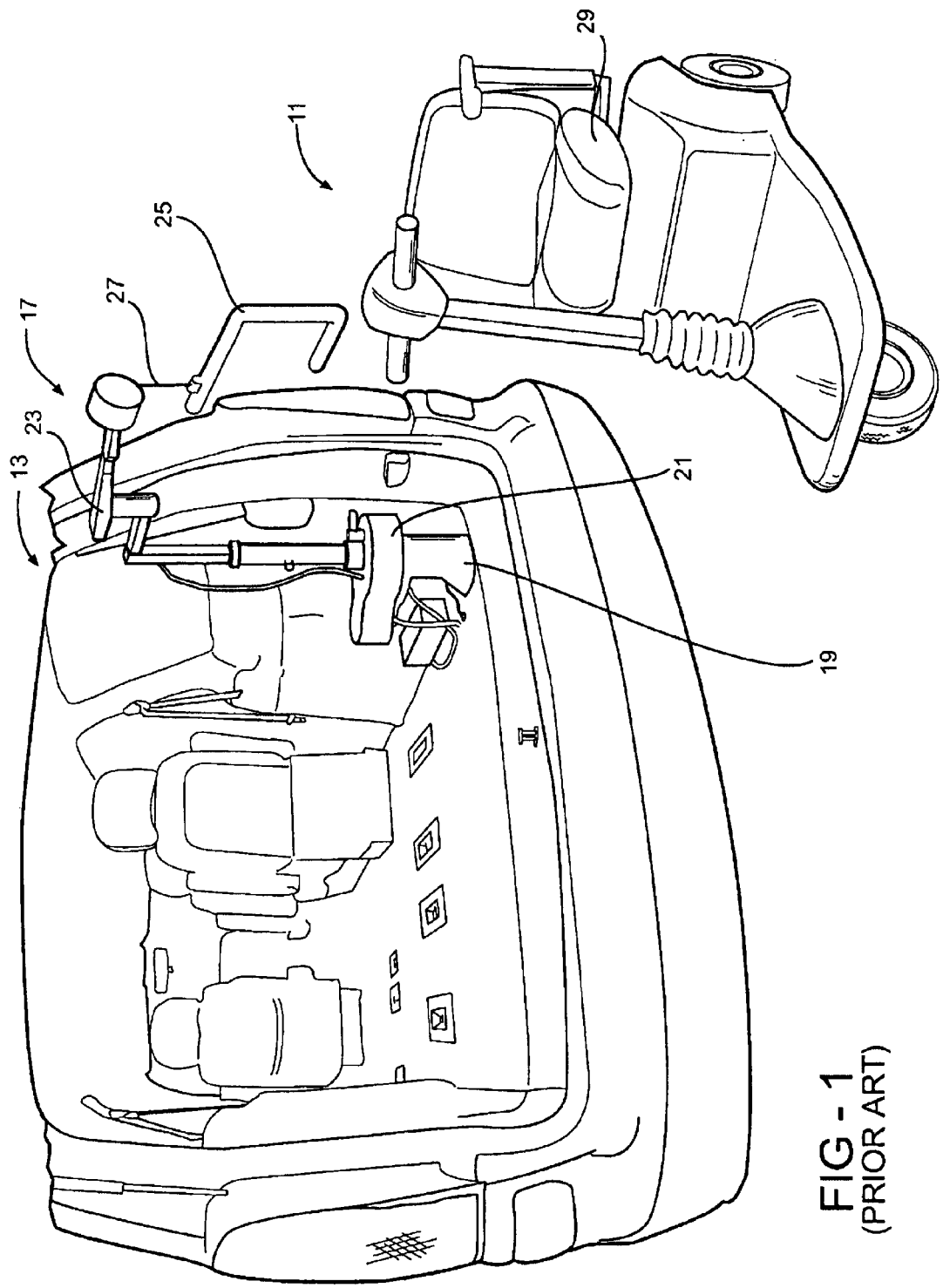
FIG. 1 depicts a typical prior art installation of an equipment hoist.
Figure 2:
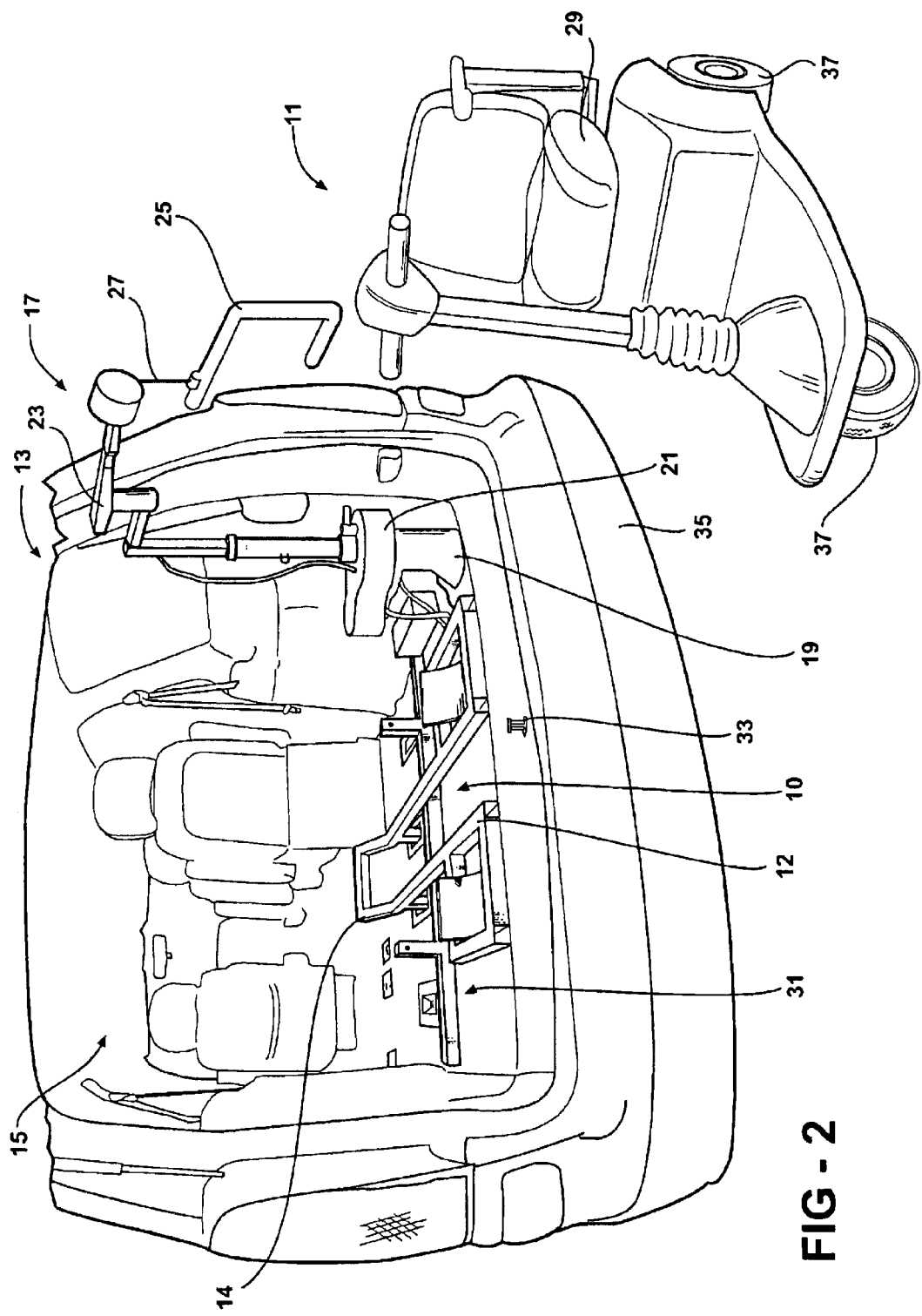
FIG. 2 is an environmental view of a vehicle, mobility equipment, a mobility equipment hoist, and a mobility equipment and hoist securement device (MHSD) according to one embodiment of the present invention.

As seen in FIG. 2, the present invention is directed to a mobility equipment and hoist securement device (MHSD) 10 that improves installation and securing arrangements of mobility equipment 11. Referring now to the drawings, the preferred embodiments of the present invention are described in detail. As illustrated in FIG. 2, one embodiment of the invention shows the MHSD 10 located in the rear interior 15 of a mini-van 13 (i.e. the storage compartment area 15 of the mini-van) with the second and third row seating removed. The MHSD 10 comprises a structural configuration 12, at least one wheel chock 14, a tie down system 16 (FIGS. 6-8B), and a rear latch plate 18 (FIGS. 6-8B). Although the MHSD 10 is shown in the rear portion of a mini-van 13, the MHSD 10 may be located in any vehicular storage compartment area 15 including the rear portion of a full-sized van, the trunk of a car, the bed of a truck, or the like.

Preferably, the structural configuration 12 is made of generally rigid material, such as aluminum, reinforced steel or the like. The structural configuration 12 is defined to comprise a plurality of horizontal bars and vertical bars. However, the structural configuration 12 may not be limited to horizontal and vertical bars, but may equally apply to any structure including a plurality of diagonal bars (not shown). Even further, curved members (e.g. in the form of a circle or the like) may be used as well. Yet even further, a combination of any one of the bar styles discussed above may be implemented in the design of the structural configuration 12. The bars that define the structural configuration 12 may be attached with any desirable method including bolting or conventional welding techniques.

Figure 3:
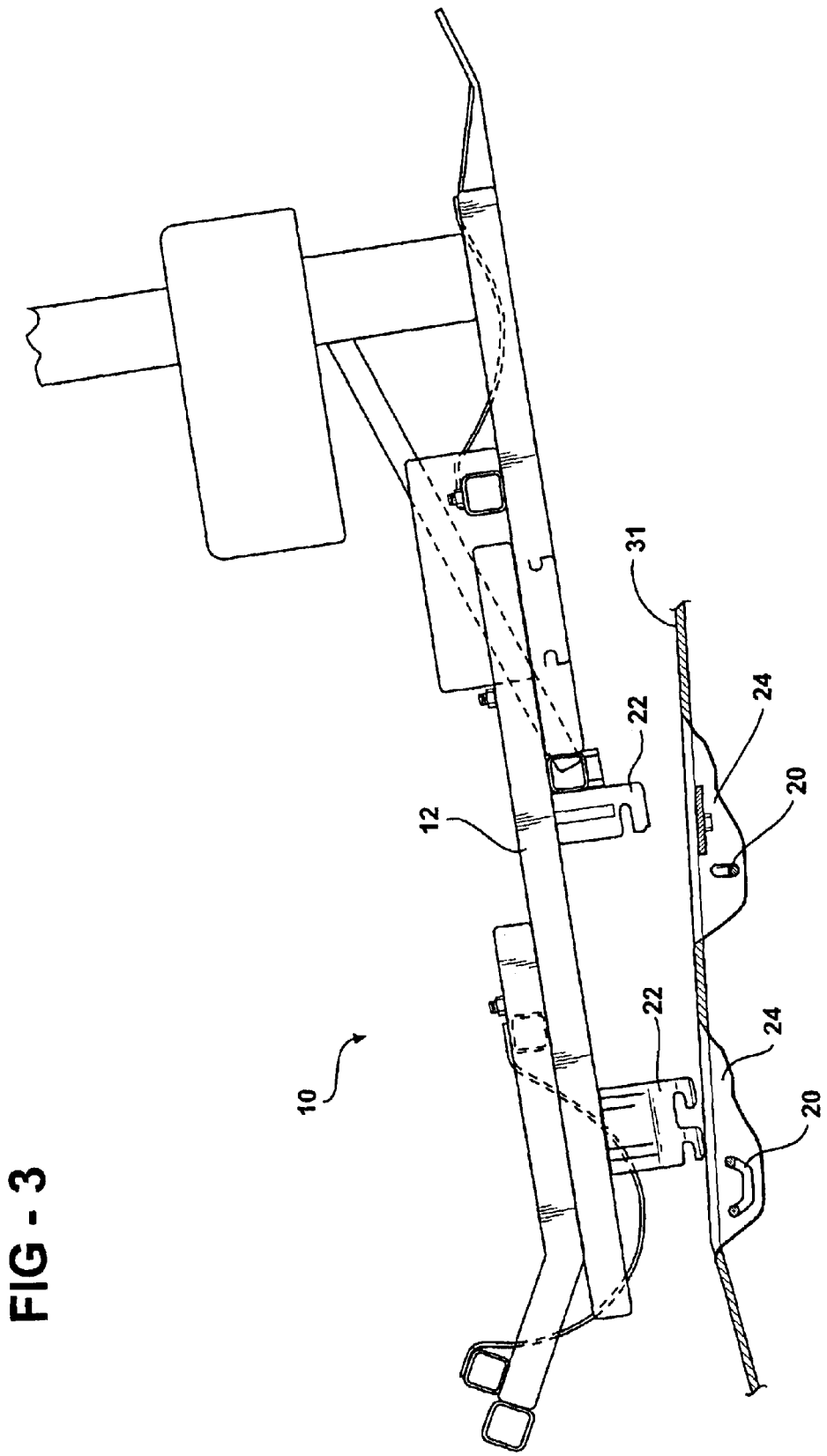
FIG. 3 is a side view of the MHSD according to one embodiment of the invention prior to being installed in the vehicle.
Figure 4:
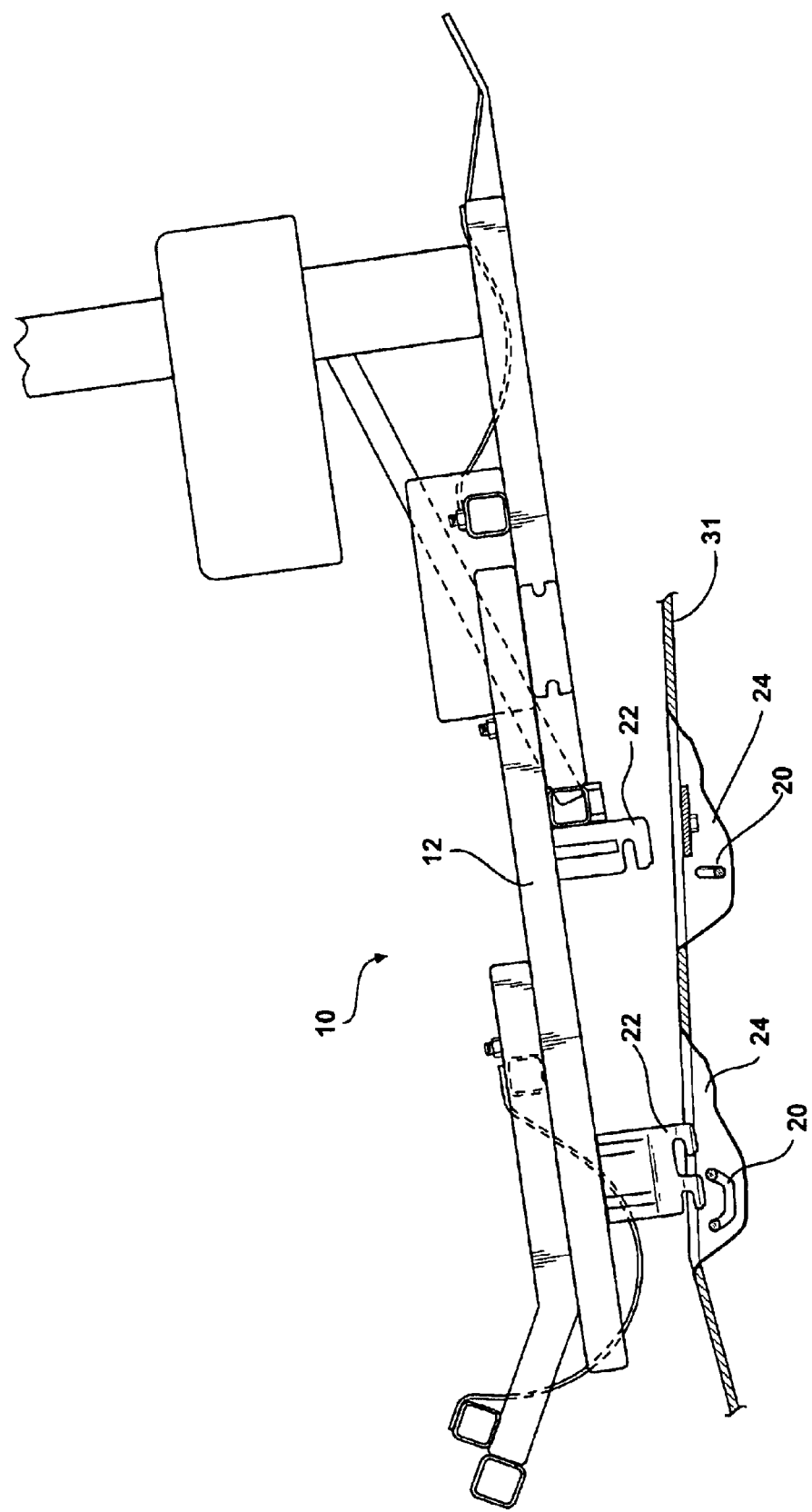
FIG. 4 is another side view of the MHSD according to one embodiment of the invention being installed in the vehicle.
Figure 5:
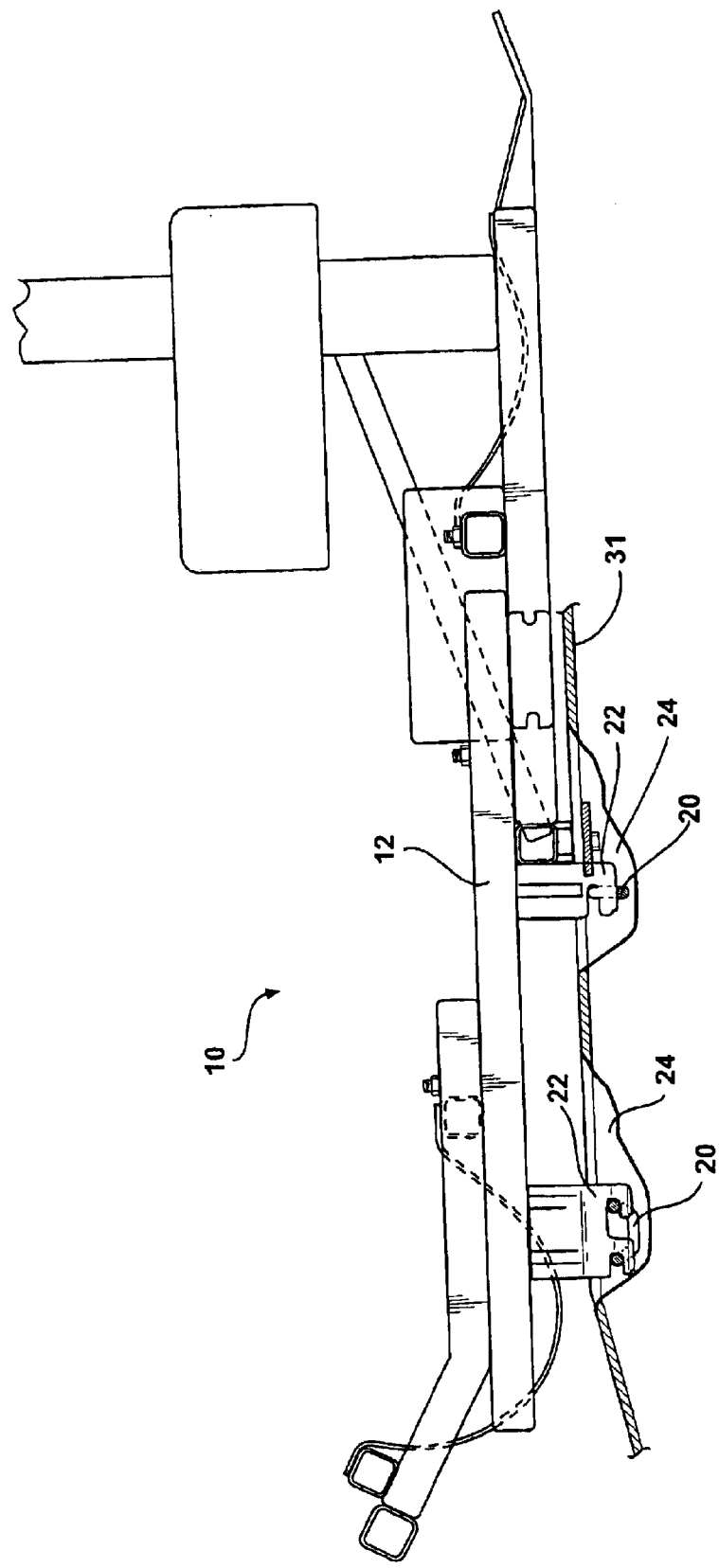
FIG. 5 is another side view of the MHSD according to one embodiment of the invention installed in the vehicle.

Referring to FIGS. 3-5, the structural configuration 12 is affixed to preinstalled seat anchors 20 by way of base pan engagement devices 22. For purposes of illustration, the pre-installed anchors 20 may be floor pins 20 that are located in floor pockets 24, and the base pan engagement devices 22 may be a plurality of J-hooks 22 that engages the floor pins 20. However, the pre-installed anchors 20 and the base pan engagement devices 22 are not meant to be limited to the floor pins 20 and J-hooks 22 and may be any structure that permits the mating of the structural configuration 12 to the base pan 31 of the vehicle 13.

The floor pins 20 are typically employed for securing removable second-row, third-row, or bucket-style seating. Similar to the installation procedure used in removing second-row, third-row, or bucket-style seating, the structural configuration 12 is slid on an elevated angle (FIGS. 3-4), so that the J-hooks 22 fully engage the floor pins 20 (FIG. 5). As the MHSD 10 slides forward, it engages floor pins 20 located within floor pockets 24.

Referring to FIGS. 6-8B, additional tension that holds the J-hooks 22 down to the floor pins 20 is derived from the bolting of the structural configuration 12 to additional pre-installed anchors, such as seat belt anchors (not shown) that are located in the base pan 31 near the sides of the storage compartment area 15. As shown in the illustrated embodiment according to FIG. 2, because the removable seating is removed from the vehicle 13, the seat belts that are associated with removable seating are removed as well. Referring to FIGS. 6-8B, the absence of the seat belts renders its anchoring available for interfacing the MHSD 10 to the body of the vehicle 13 by bolting it thereto with bolts 26, such as "L-shaped" bolting pins 26. Thus, the structural configuration 12 is essentially bolted to the seat belt anchors, and thereby provides a positive securement of the MHSD 10 in the storage compartment area 15.

The overall design of the structural configuration 12 may be defined as a permanently welded structure (FIG. 6) that accommodates floor pin and pocket configurations of many mini-van designs including those made by General Motors, Ford, DaimlerChrysler, Honda, or Toyota. However, the structural configuration 12 may also be designed with a certain degree of flexibility (FIG. 7) that permits manual, selective readjustments for accommodating floor pin and pocket configurations that do not align with the J-hooks 22 located on the structural configuration 12. In such an embodiment, the horizontal and vertical bars of the structural configuration 12 may be selectively adjusted with any desirable locking arrangement, such as a nut-and-bolt arrangement, or the like.

As seen in FIGS. 6-8B, the structural configuration 12 may also make use of an additional rear latch plate 18 for attaching the MHSD 10 to the vehicle 13. The rear latch plate 18 may be attached to the structural configuration 12 with any desirable method including bolting or conventional welding techniques. Essentially, the latch plate 18 is anchored to the vehicle using the existing mounting holes used by the rear latch mechanism 33 of the vehicle 13 that latches the hatch portion (i.e. rear door) of the mini-van 13.

The overall arrangement of the MHSD 10 in the storage compartment area 15 permits the implementation of a plurality of different hoists 17. If the MHSD 10 is located in the middle of the storage compartment area 15, a power-extract mechanism on the hoist 17 may be needed so that the boom portion 23 of the hoist 17 may clear the rear of the vehicle 13. This particular MHSD and hoist arrangement would locate the mobility equipment 11 in close proximity to the bumper 35 (FIG. 2) so that the boom 23 may elevate and prepare the mobility equipment 11 for loading. The fallback of this particular MHSD and hoist arrangement is that a power-extract mechanism is typically called for in its design, thus increasing the expense of the hoist 17 by the need for another electric motor, which is coupled to the power-extract mechanism.

Alternatively, if the MHSD 10 is located offset to one side of the storage compartment area 15 from its middle, a hoist 17 with a fixed arm length may be implemented in the MHSD and hoist arrangement. This particular MHSD and hoist arrangement does not call for the use of the power-extract mechanism because the mobility equipment 11 clears the bumper 35 of the vehicle 13 when the boom 23 elevates and prepares the mobility equipment 11 for loading. Thus, the expense of a power-extract mechanism is removed from the overall cost of the hoist 17 for this particular arrangement.

As explained above, the mobility equipment 11 is typically loaded by a hoist 17; thus the design of the MHSD 10 permits a mounting arm 19 of the hoist 17 to be attached to at least one of the horizontal and/or vertical bars of the structural configuration 12 at a mounting arm-receiving portion 28. The mounting arm 19 of the hoist 17 may be attached to the structural configuration 12 by any one of a plurality of securing means, such as bolts. Because the hoist 17 may be bolted to the structural configuration 12, greater flexibility for interfacing many different hoist designs is enabled. Once the hoist 17 loads the mobility equipment 11 into the storage compartment area 15, proper securement of the mobility equipment 11 may be initiated.

Figure 6:
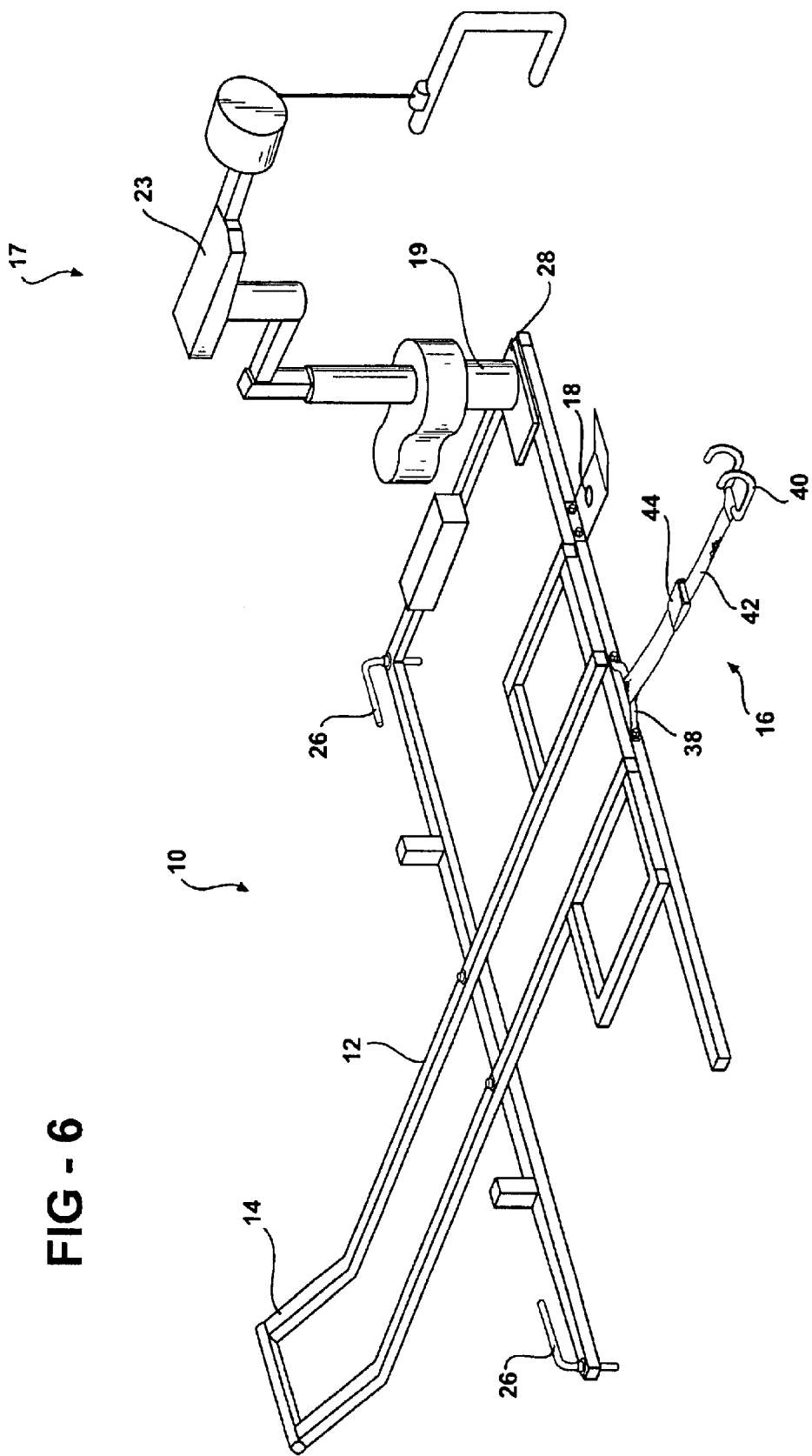
FIG. 6 is a perspective view of the MHSD according to one embodiment of the invention.
Figure 8A:
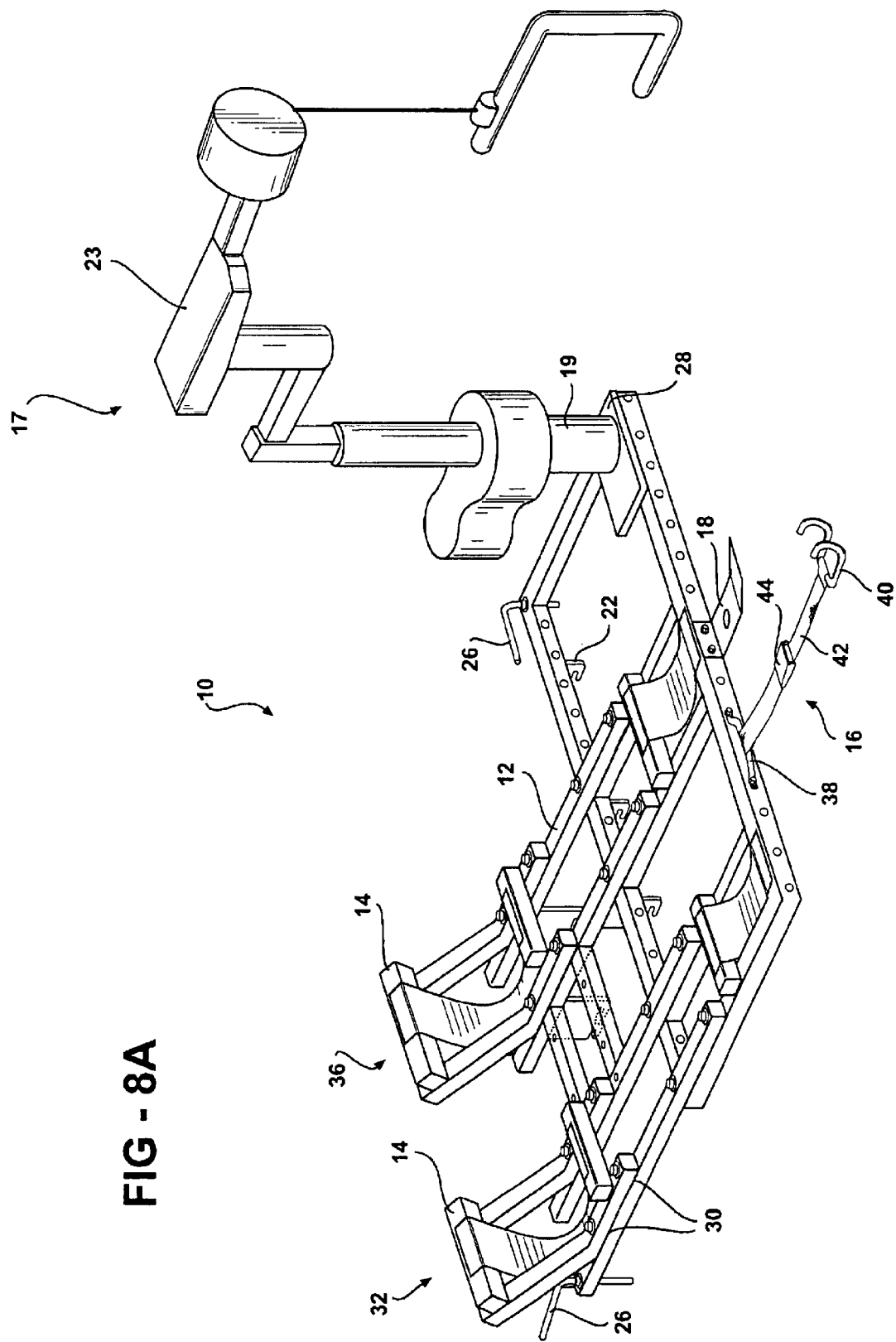
FIG. 8A is one embodiment of the MHSD according to FIG. 6.
Figure 8B:
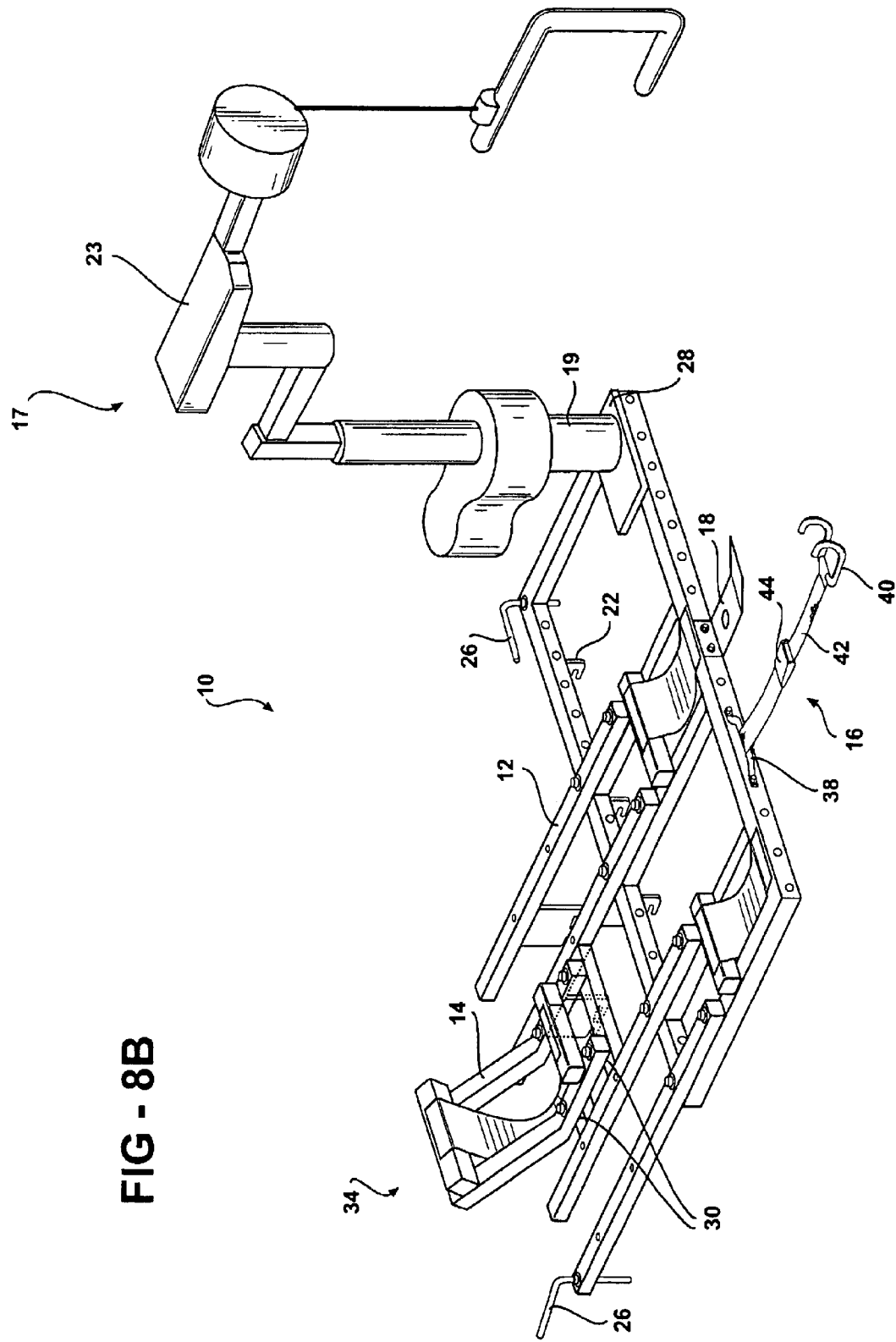
FIG. 8B is another embodiment of the MHSD according to FIG. 6.

As seen in FIGS. 6 and 8A-8B, once the mobility equipment 11 is located over the MHSD 10 by the hoist 17, proper securement of the front portion of the mobility equipment 11 may be positively secured to the MHSD 10 by engaging the front tire(s) 37 of the mobility equipment 11 with securing means, such as wheel chocks 14. Typically, mobility equipment 11 may have three or four wheels (i.e. one or a pair of front tires 37 that engage the wheel chocks 14). Therefore, the MHSD 10 may comprise at least one wheel chock 14 for receiving the tire(s) 37 of the mobility equipment 11. The wheel chock 14 is angled upward so that it may pass and engage the tire(s) 37 beyond the center point so that the mobility equipment 11 may be grounded to the horizontal bars of the structural configuration 12. As a result of the wheel chock design, the mobility equipment 11 is prevented from rolling forward or being pulled upward and out of the MBSD 10.

As seen in FIG. 6, a seamless MHSD 10 may be designed to be a fixed, unitary device that exclusively accommodates three- or four-wheeled mobility equipment 11 (i.e. the MHSD 10 is designed to exclusively include one or a pair wheel chocks 14, respectively). Alternatively, as seen in FIGS. 8A-8B, the MHSD 10 may be designed for selective accommodation of three- or four-wheeled mobility equipment 11. In order to selectively accommodate three- or four-wheeled mobility equipment 11, the MHSD 10 may be designed with a degree of flexibility by incorporating interchangeable wheel chocks 14 in its design.

Figure 7:
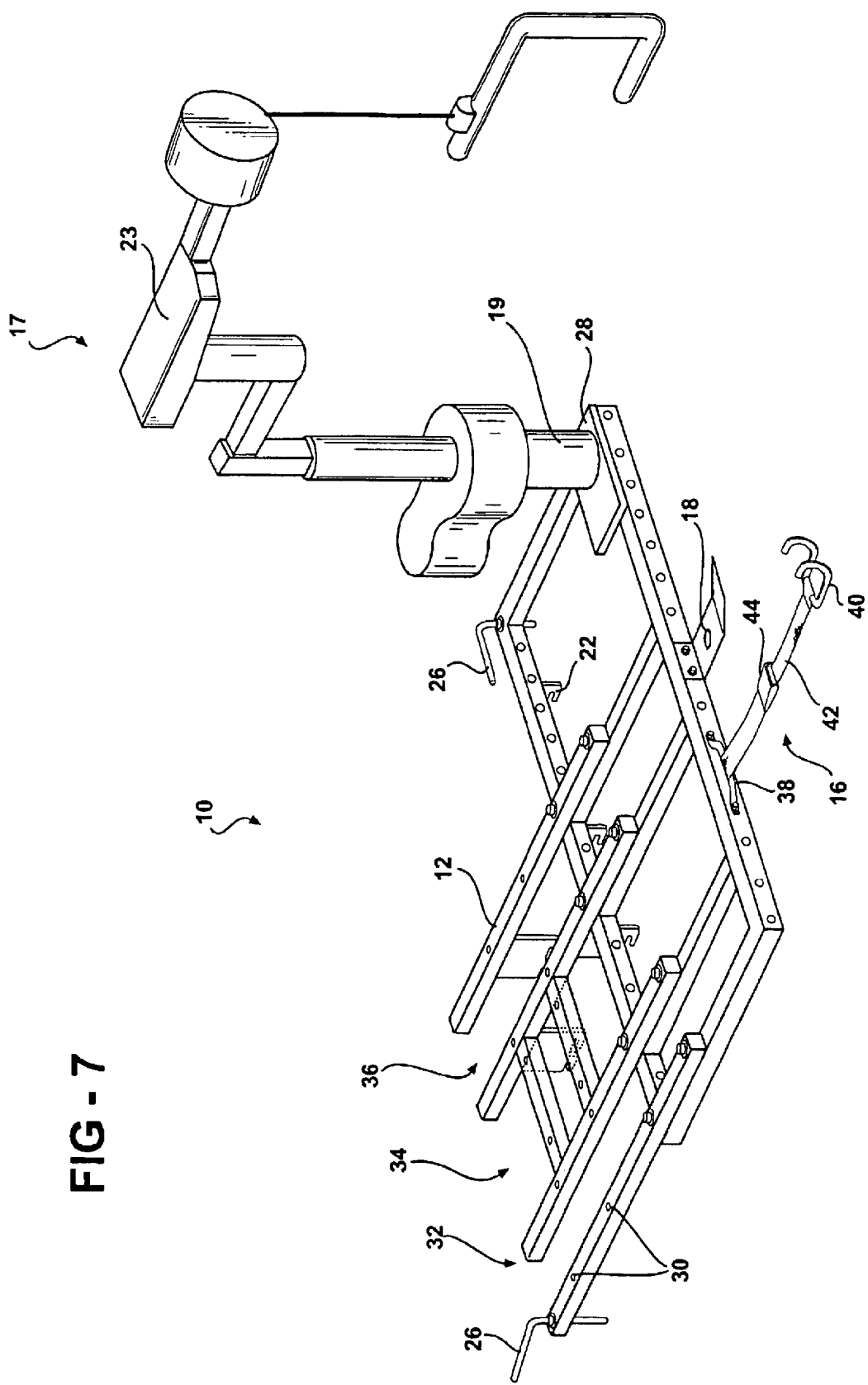
FIG. 7 is a perspective view of a partially formed MHSD according to another embodiment of the invention.

The selective accommodation of three- or four-wheeled mobility equipment 11 is enabled though the ability to interchange one or a pair of wheel chocks 14 at the front portion of the MHSD 10. As seen in FIG. 7, the MHSD 10 is designed to include wheel chock-receiving portions 30 for receiving the interchangeable wheel chocks 14 at the top-left portion 32, top-middle portion 34, and top-right portion 36 of the structural configuration 12. Referring specifically to FIG. 8A, an MHSD 10 selectively configured to secure four-wheeled mobility equipment 11 may be constructed by locating wheel chocks 14 at the top-left 32 and top-right 36 wheel chock-receiving portions 30. Referring specifically to FIG. 8B, an MHSD 10 that is selectively configured to secure three-wheeled mobility equipment 11 may be constructed by locating a wheel chock 14 at the top-middle 34 wheel chock-receiving portion 30.

Once the front portion (i.e. front tire(s) 37) of the mobility equipment 11 is placed about and secured by wheel chocks 14, the rear or center portion (i.e. a rear structure or a center structure) of the mobility equipment 11 may also be secured to the MHSD 10 with securing means, such as a tie-down system 16. For purposes of illustration, the tie-down system 16, as shown in FIGS. 6-8B is located at the rear of the structural configuration 12 for engaging the rear portion of the mobility equipment 11. The rear portion of the mobility equipment 11 may include a structural bar (not shown) and may be used in combination with the tie-down system 16 in order to provide rear portion securement. However, a structural bar or the like located near the center portion of the mobility equipment 11 may be alternatively engaged by the tie-down system 16.

The tie-down system 16 may comprise a handle portion 38, which is attached to the structural configuration 12, and a mobility equipment engagement device 40, such as a double-forked hook 40 made from hardened steel or the like. The handle portion 38 may be attached to the MHSD 10 with any desirable method including bolting or any conventional welding technique. The handle portion 38 and the double-forked hook 40 are shown to be intermediately connected by a seat-belt fabric material 42. Although the mobility equipment engagement device 40 is shown to be a doubled-forked hook 40, the mobility equipment engagement device 40 may alternatively be any type of engaging mechanism including: reinforced cargo netting, a fork-over pin (e.g. with a male portion and a female portion), a pin-and-receiver that is electrical or mechanical on disengagement, a clamping device, a cam lever device, or a permanent installed receiver on either the tie-down system 16, the mobility equipment 11, or both.

In operation, the doubled-forked hook 40 engages the structural bar on the back of the mobility equipment 11. Once the doubled-forked hook 40 engages the mobility equipment 11, the seat-belt material 42, which goes through a cam device 44, may be pulled taught in order to provide additional cinching of the tie-down system 16. Once the seat-belt material 42 is pulled taught, the rear portion of the mobility equipment 11 is secured to the MHSD 10. Thus, the front and rear portion of the mobility equipment 11 engages and is positively secured by the MHSD 10.

By employing the inventive mobility equipment and hoist securing device (MHSD) 10, it will be appreciated that the body structure of a vehicle 13 does not have to be altered (i.e. holes do not have to be drilled in base-pan 31, frames, or the like). Because the MHSD 10 may be installed into a vehicle 13 that is free of damaging alterations, the structural integrity of the vehicle 13 is kept intact. Thus, a person leasing a vehicle 13 may install the MHSD 10 on the vehicle 13 without having to bear the responsibly of installation damage. Even further, the mobility equipment hoist 17 may be bolted to the MHSD 10 so that the hoist 17 and the MHSD 10 become a unitary system that can be installed in the vehicle storage compartment area 15. Because the MHSD 10 essentially grounds itself to the vehicle 13 in the storage compartment area 15, it is possible to positively secure mobility equipment 11 and mobility equipment hoists 17 in the vehicle 13. Yet even further, the MHSD 10 impedes mobility equipment 11 and mobility equipment hoists 17 from movement in certain accident situations.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A device for securing a mobility device in a motor vehicle, comprising:
   a structural configuration that affixes to pre-installed anchors on the motor vehicle;
   at least one wheel chock for securing a front portion of a mobility device; and
   a tie-down system for securing a rear or center portion of the mobility device,
   wherein the pre-installed anchors are floor pins located in floor pockets and seat belt anchors located about a floor pan of the motor vehicle.

2. The device of claim 1 further including a rear latch plate attached to the structural configuration and adapted to engage a rear latching mechanism portion of the motor vehicle.

3. The device of claim 2, wherein the rear latch plate is bolted to the structural configuration.

4. The device of claim 2, wherein the rear latch plate is welded to the structural configuration.

5. The device of claim 1 further including a base pan engagement device attached to the structural configuration that engages the floor pins.

6. The device of claim 5, wherein the base pan engagement device is a plurality of J-books.

7. The device of claim 1 further including bolts that pass through the structural configuration and engage the seat belt anchors.

8. The device of claim 1, wherein each wheel chock respectively includes wheel chock-receiving portions for selectively locating the wheel chocks along the structural configuration.

9. The device of claim 8, wherein the wheel chock-receiving portions are located at the top-left, top-middle, and top-right of the structural configuration.

10. The device of claim 1, wherein the structural configuration further includes a mounting arm receiving portion for selectively mounting a mounting arm of a mobility equipment hoist to the structural configuration.

11. The device of claim 1, wherein the tie-down system further includes a handle portion and a mobility equipment engagement device that is intermediately connected by a seat belt-like material that interacts with a cam device for providing additional cinching of the tie-down system.

12. The device of claim 11, wherein the mobility equipment engagement device is a double-forked hook.

13. The device of claim 1, wherein the structural configuration is made of reinforced steel.

14. The device of claim 1, wherein the structural configuration is attached to at least one of the pro-installed anchors of the motor vehicle with bolts.

15. The device of claim 1, wherein the structural configuration includes a plurality of bars that are welded to one another.

16. The device of claim 1, wherein the structural configuration includes horizontal and vertical bars.

17. The device of claim 1, wherein the structural configuration comprises diagonal bars.

18. The device of claim 1, wherein the structural configuration comprises circular bars.

19. A device for securing a mobility device in a motor vehicle, comprising:
   a structural configuration chat affixes to pre-installed anchors on the motor vehicle;
   at least one wheel chock for securing a front portion of a mobility device; and
   a tie-down system for securing a rear or center portion of the mobility device,
   wherein the structural configuration further includes a mounting aim receiving
   portion for selectively mounting a mounting arm of a mobility equipment hoist to
   the structural configuration.

20. A device for securing a mobility device in a motor vehicle, comprising:
   a structural configuration that affixes to pie-installed anchors on the motor vehicle;
   at least one wheel chock for securing a front portion of a mobility device; and
   a tie-down system for securing a rear or center portion of the mobility device, wherein the tie-down system further includes a handle portion and a mobility equipment engagement device that is intermediately connected by a seat belt-like material that interacts with a cam device for providing additional cinching of the tie-down system.

* * * * *